(12) United States Patent
Lee et al.

(10) Patent No.: US 12,673,632 B2
(45) Date of Patent: Jul. 7, 2026

(54) AIRBAG CUSHION

(71) Applicant: HYUNDAI MOBIS CO., LTD., Seoul (KR)

(72) Inventors: Seok Min Lee, Yongin-si (KR); Dong Young Kim, Hwaseong-si (KR); Dong Joon Lee, Goyang-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 19/208,408

(22) Filed: May 14, 2025

(65) Prior Publication Data

US 2026/0054682 A1 Feb. 26, 2026

(30) Foreign Application Priority Data

Aug. 22, 2024 (KR) ........................ 10-2024-0113043

(51) Int. Cl.
| | |
|---|---|
| B60R 21/2338 | (2011.01) |
| B60R 21/214 | (2011.01) |
| B60R 21/231 | (2011.01) |
| B60R 21/232 | (2011.01) |
| B60R 21/237 | (2006.01) |
| B60R 21/235 | (2006.01) |

(52) U.S. Cl.
CPC .......... B60R 21/232 (2013.01); B60R 21/214 (2013.01); B60R 21/231 (2013.01); B60R 21/2338 (2013.01); B60R 21/237 (2013.01); B60R 2021/23382 (2013.01); B60R 2021/23576 (2013.01)

(58) Field of Classification Search
CPC . B60R 21/232; B60R 21/2338; B60R 21/237;
B60R 21/231; B60R 21/214; B60R 21/213; B60R 21/2334; B60R 2021/23382; B60R 2021/23576; B60R 2021/0048; B60R 2021/23192; B60R 2021/01238
USPC ..................... 280/728.1, 743.1, 730.1, 743.2
See application file for complete search history.

(56) References Cited

U.S. PATENT DOCUMENTS

| | | | | |
|---|---|---|---|---|
| 8,579,321 B2 * | 11/2013 | Lee | ........................ | B60R 21/233 |
| | | | | 280/729 |
| 8,807,593 B2 * | 8/2014 | Lee | ........................ | B60R 21/213 |
| | | | | 280/730.1 |
| 11,613,226 B2 * | 3/2023 | Fischer | ................. | B60R 21/232 |
| | | | | 280/730.1 |
| 11,865,991 B1 * | 1/2024 | Schneider | ......... | B60R 21/23138 |
| 2001/0033072 A1 * | 10/2001 | Kumagai | ........... | B60R 21/2338 |
| | | | | 280/743.1 |
| 2014/0015230 A1 * | 1/2014 | Le Norcy | ........... | B60R 21/2342 |
| | | | | 280/728.1 |
| 2016/0311393 A1 * | 10/2016 | Smith | .................... | B60R 21/231 |

(Continued)

FOREIGN PATENT DOCUMENTS

| | | | | | |
|---|---|---|---|---|---|
| CN | 109774646 A | * | 5/2019 | | |
| CN | 113602229 A | * | 11/2021 | ............. | B60R 21/26 |

(Continued)

*Primary Examiner* — Keith J Frisby
(74) *Attorney, Agent, or Firm* — NovoTechIP International PLLC

(57) ABSTRACT

Disclosed is an airbag cushion including: an airbag cushion deployed downward from a roof within a vehicle cabin toward the front of a passenger; and a pocket portion having a concave space formed in a portion of the airbag cushion on which the passenger's head is supported.

10 Claims, 7 Drawing Sheets

(56)                    References Cited

U.S. PATENT DOCUMENTS

| | | | | |
|---|---|---|---|---|
| 2019/0217804 A1 * | 7/2019 | Cho | ...................... | B60R 21/233 |
| 2019/0337478 A1 * | 11/2019 | Schneider | ............. | B60R 21/214 |
| 2019/0375363 A1 * | 12/2019 | Abe | ...................... | B60R 21/233 |
| 2023/0007863 A1 * | 1/2023 | Min | ................... | B60R 21/2338 |
| 2023/0015426 A1 * | 1/2023 | Meng | ................... | B60R 21/213 |

FOREIGN PATENT DOCUMENTS

| | | | | | | |
|---|---|---|---|---|---|---|
| CN | 221137999 U | * | 6/2024 | | | |
| DE | 102010060928 A1 | * | 3/2012 | | .......... | B60R 21/214 |
| DE | 102022109942 A1 | * | 10/2022 | | .......... | B60R 21/233 |
| JP | 2013071704 A | * | 4/2013 | | | |
| JP | 2018016174 A | * | 2/2018 | | | |
| JP | 2019043474 A | * | 3/2019 | | | |
| JP | 2021030854 A | * | 3/2021 | | | |

* cited by examiner

AIRBAG CUSHION

CROSS-REFERENCE TO RELATED APPLICATIONS

The present application claims priority of Korean Patent Application No. 10-2024-0113043 filed on Aug. 22, 2024, the entire contents of which is incorporated herein for all purposes by this reference.

TECHNICAL FIELD

The present disclosure relates to an airbag cushion, which creates a space for a passenger's head to enter within an airbag cushion deployed downward from a roof, thereby preventing a risk of neck injury to the passenger.

BACKGROUND

With a passenger seat airbag mounted in an instrument panel, a passenger's head settles onto an airbag cushion and is naturally restrained, thereby protecting the passenger.

On the other hand, a roof-mounted airbag is mounted above a headliner and deployed downward along a windshield, supporting the passenger's head on the airbag cushion.

However, with the roof-mounted airbag, when the passenger's head rotates while settling onto the airbag cushion, unlike with a conventional passenger seat airbag, the passenger's head rotates in the opposite direction to a loading direction of the passenger's upper body and the passenger's neck bends, potentially leading to a risk of neck injury.

The matters described above as a background art are provided solely to facilitate a better understanding of the background of the present disclosure and should not be construed as an admission that they constitute a related art already known to those skilled in the art.

SUMMARY

The present disclosure is proposed to provide an airbag cushion, which creates a space for a passenger's head to enter within an airbag cushion deployed downward from a roof, thereby preventing a risk of neck injury to the passenger.

Technical objectives of the present disclosure are not limited to the technical objectives mentioned above, and other technical objectives not mentioned above will be clearly understood by those skilled in the art from the following description.

An airbag cushion according to the present disclosure may include: an airbag cushion deployed downward from a roof within a vehicle cabin toward the front of a passenger; and a pocket portion having a concave space formed in a portion of the airbag cushion on which the passenger's head is supported.

The airbag cushion may be configured with side panels fixed to the left and right sides of a main panel provided in the middle of the airbag cushion, and the pocket portion may have an entrance formed with an opening in the middle of the main panel and be embedded, in a pocket shape, inside the airbag cushion.

The pocket portion may be formed by joining a first pocket panel and a second pocket panel, having a predetermined area in the middle of the main panel, in a front-to-back manner; and may be formed into a pocket shape by fixing both side surfaces of the first pocket panel and both side surfaces of the second pocket panel to each other.

The first pocket panel and the second pocket panel may be formed integrally with the main panel.

The first pocket panel and the second pocket panel may be provided separately from the main panel.

The first pocket panel and the second pocket panel may be formed symmetrically with respect to a boundary line, where the first pocket panel and the second pocket panel are joined to each other, and may be folded along the boundary line, and sewn and fixed on the both side surfaces.

A first tether may be connected between an end of the pocket portion and an inner surface of the airbag cushion located in a direction in which the passenger's head enters.

One end of the first tether may be fixed to a boundary line of inner ends of the first pocket panel and the second pocket panel, and the other end of the first tether may be fixed to an inner surface of the main panel facing a front lower portion of the pocket portion.

A second tether may be connected to the inner surface of the airbag cushion located orthogonal to a side surface of the pocket portion and a direction in which the passenger's head enters.

One end of the second tether may be fixed to the middle of the first pocket panel, and the other end of the second tether may be fixed to an inner surface of the main panel facing a front upper portion of the pocket portion.

One end of the second tether may be fixed to the middle of the second pocket panel, and the other end of the second tether may be fixed to an inner surface of the main panel facing a rear lower portion of the pocket portion.

Another configuration of the airbag cushion according to the present disclosure may include: an airbag cushion deployed toward the front of a passenger within a vehicle cabin; and a pocket portion having a concave space formed in a portion of the airbag cushion on which the passenger's head is supported.

With the airbag cushion of the present disclosure, the pocket portion having the concave space configuration is provided in a portion of the airbag cushion on which the passenger's head is supported. Accordingly, the passenger's head is supported when entering the pocket portion, preventing the passenger's head from bending backward. Therefore, a risk of neck injury to the passenger is reduced.

The effects which may be achieved in the present disclosure are not limited to the effects mentioned above, and other effects not mentioned above will be clearly appreciated by those skilled in the art from the following description.

BRIEF DESCRIPTION OF THE DRAWINGS

FIG. 3 is a view illustrating a configuration of a roof-mounted airbag module according to the present disclosure.

FIG. 4 is a side view illustrating a configuration in which a passenger's head has entered a space formed in the airbag cushion according to the present disclosure.

DETAILED DESCRIPTION

Figure 1:
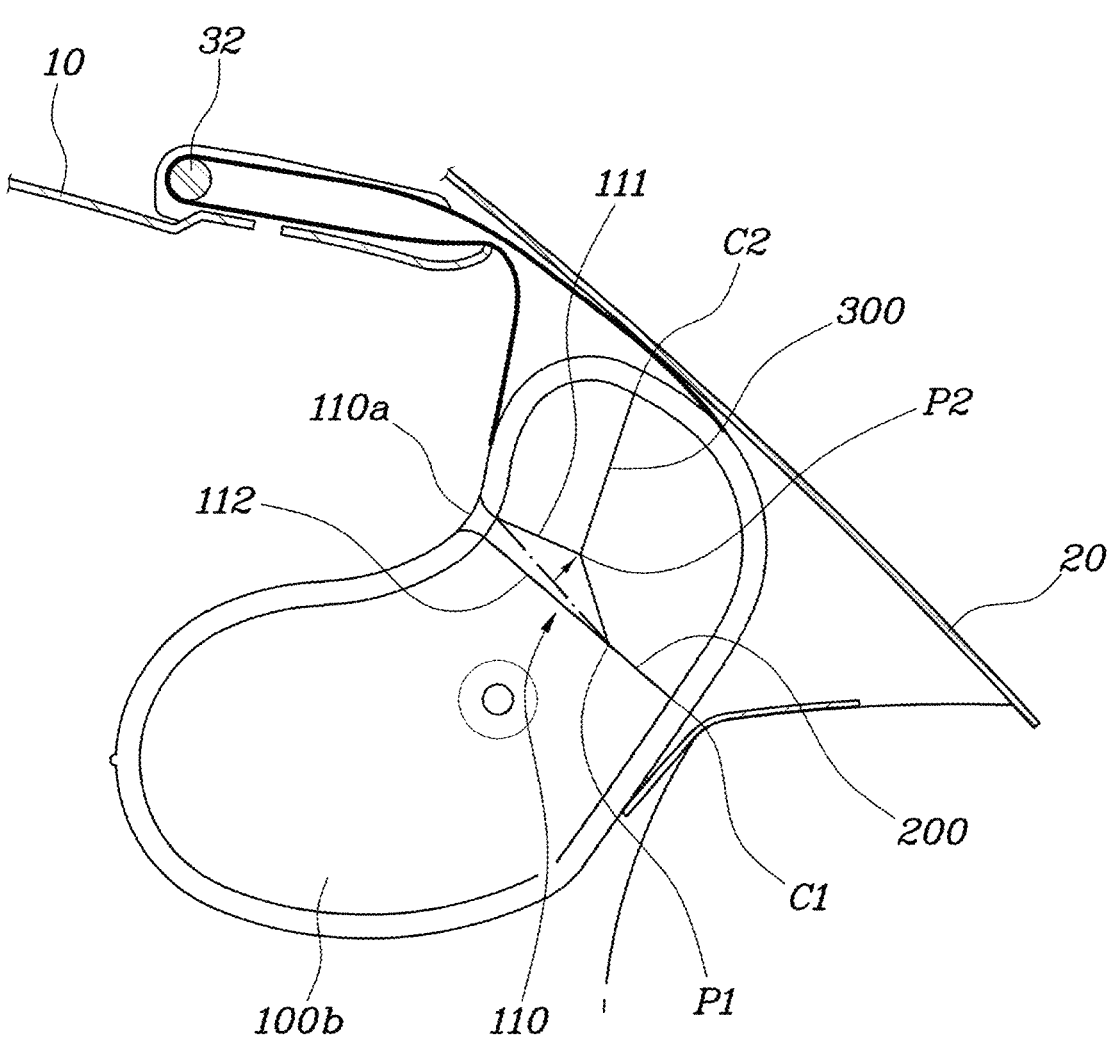
FIG. 1 is a view illustrating a deployed configuration of a roof-mounted airbag cushion according to an embodiment of the present disclosure.

In describing embodiments disclosed herein, when a detailed description of a known related art is determined to obscure the gist of the present specification, the detailed description thereof will be omitted herein. In addition, the accompanying drawings are merely for easy understanding of the embodiments disclosed herein, and the technical spirit disclosed herein is not limited by the accompanying drawings, and it should be understood to include all modifications, equivalents, and substitutes included in the spirit and scope of the present disclosure.

Terms including ordinal numbers such as first, second, and the like used herein may be used to describe various components, but the various components are not limited by these terms. The terms are used only for the purpose of distinguishing one component from another component.

Unless the context clearly dictates otherwise, the singular form includes the plural form.

The terms "comprising," "having," or the like as used herein are used to specify that a feature, a number, a step, an operation, a component, an element, or a combination thereof described herein exists, and they do not preclude the presence or addition of one or more other features, numbers, steps, operations, components, elements, or combinations thereof.

As used in the following description, suffixes "module" and "part" for a component are used or interchangeably used solely for ease of preparation of the specification, and do not have different meanings and each of them does not function by itself.

When a component is referred to as being "connected" or "coupled" to another component, the component may be directly connected or coupled to another component, but it should be understood that still another component may be present between the component and another component. Conversely, when a component is referred to as being "directly connected" or "directly coupled" to another, it should be understood that still another component may not be present between the component and another component.

Hereinafter, embodiments disclosed herein will be described in detail with reference to the drawings. The same reference numerals are given to the same or similar components regardless of reference numerals, and a repetitive description thereof will be omitted.

The present disclosure relates to a roof-mounted airbag cushion 100, which is configured to include: an airbag cushion 100 deployed downward from a roof 10 within a vehicle cabin toward the front of a passenger; and a pocket portion 110 having a concave space formed in a portion of the airbag cushion 100 on which a passenger's head is supported.

Figure 2:
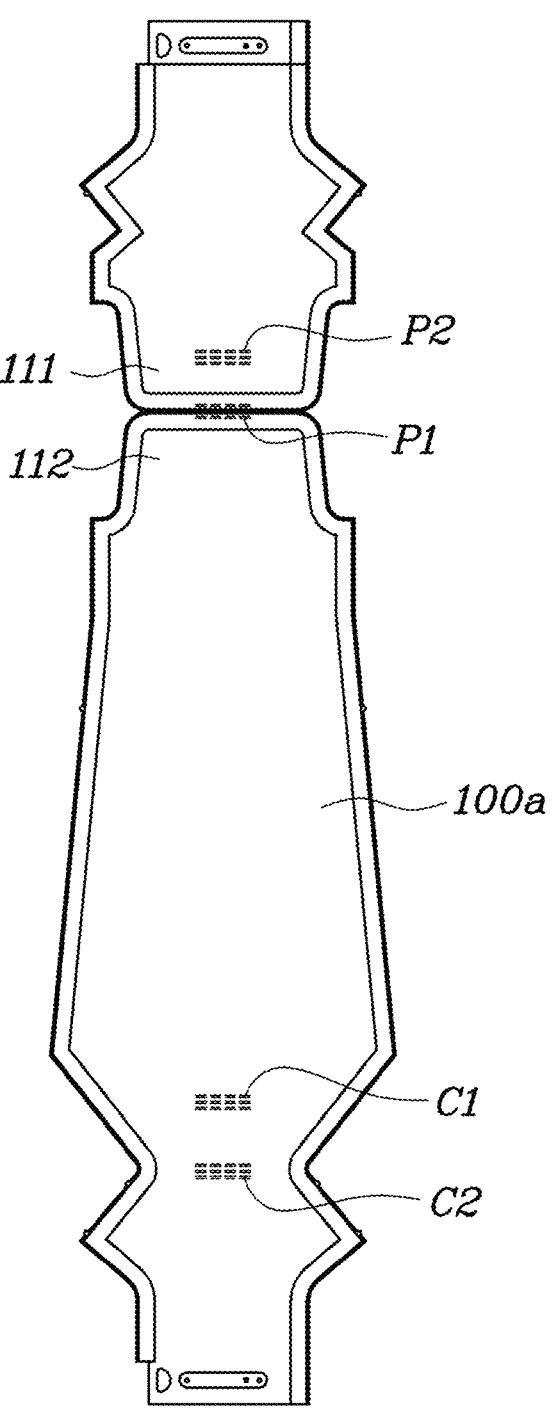
FIG. 2 is a view illustrating an unfolded main panel constituting the airbag cushion according to the present disclosure.
Figure 3:
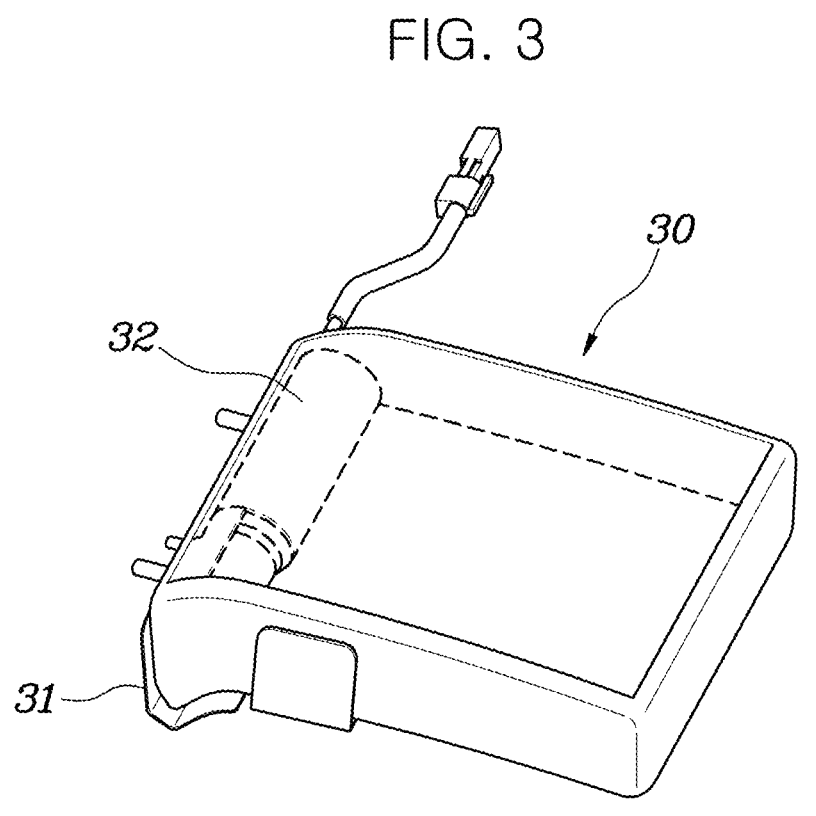
Figure 5:
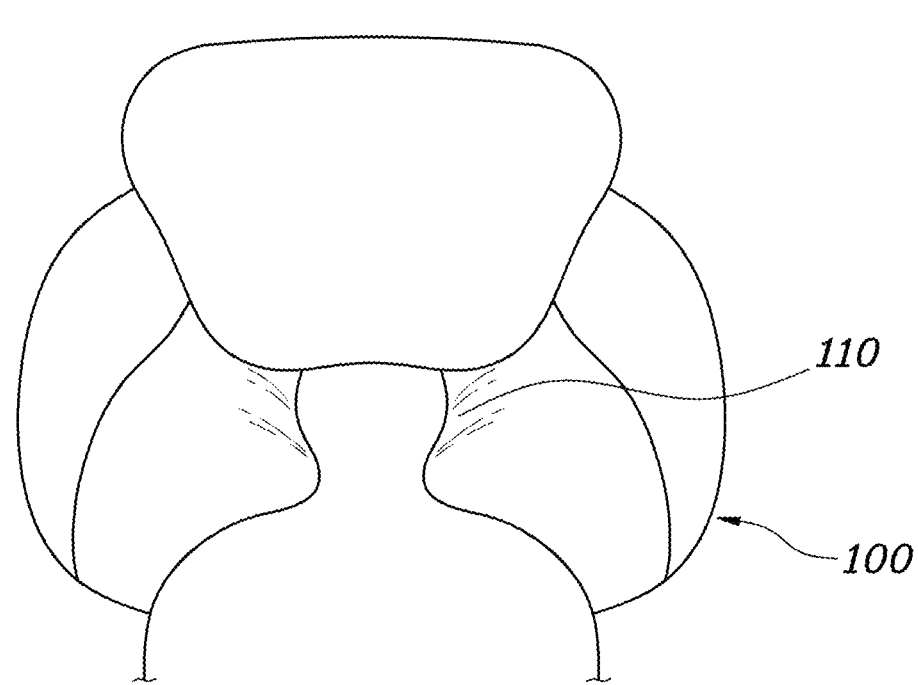
FIG. 5 is a rear view illustrating a configuration in which the passenger's head has entered the space formed in the airbag cushion according to the present disclosure.

Referring to FIGS. 1 to 3, a roof-mounted airbag module 30 is provided on the roof 10 of a vehicle.

The airbag module 30 may have an airbag housing 31 mounted on an upper portion of a headliner, with the airbag cushion 100 folded inside the airbag housing 31. An airbag cover may be assembled onto the airbag housing 31 in a configuration that covers the airbag cushion 100.

An inflator 32, along with the airbag housing 31, may be mounted on a vehicle body. A discharge port of the inflator 32 may be connected to the airbag cushion 100 such that gas generated from the inflator 32 may be supplied to the airbag cushion 100.

The airbag cushion 100, which is inflated by the gas from the inflator 32, is deployed downward along a windshield 20 from the upper portion of the headliner. In a preferred example, the airbag cushion 100 is deployed in front of the passenger in the passenger seat to support the passenger's head.

In particular, the pocket portion 110 having a configuration of the concave space is provided in the portion of the airbag cushion 100 on which the passenger's head is supported.

Figure 4:
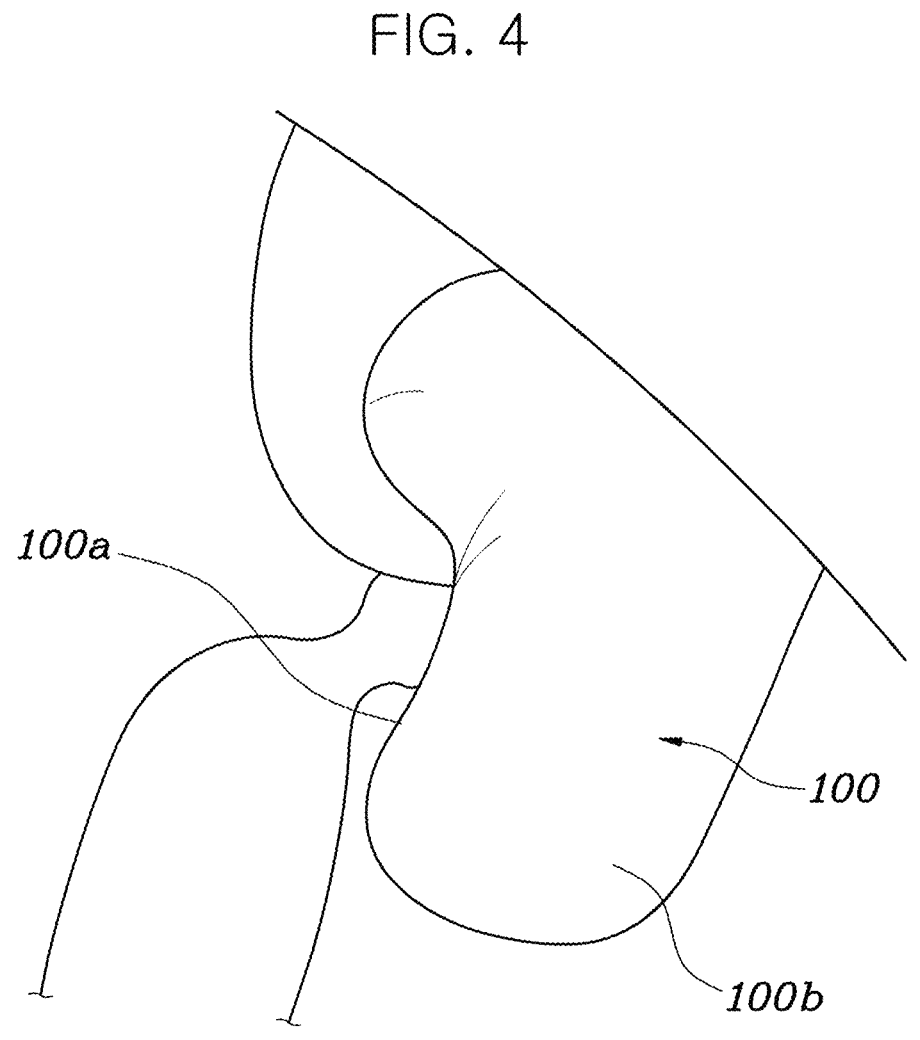

Accordingly, as shown in FIGS. 3 and 4, the passenger's head enters the pocket portion 110 formed in the airbag cushion 100 and is supported thereon so as to prevent the passenger's head from bending backward, thereby reducing a risk of neck injury to the passenger.

In addition, in the present disclosure, the airbag cushion 100 may be configured with side panels 100*b* connected or fixed to two opposed sides (e.g., the left and right sides) of a main panel 100*a* provided at a middle portion of the airbag cushion 100; and the pocket portion 110 may have an entrance 110*a* formed with an opening at a middle portion of the main panel 100*a* and be embedded inside the airbag cushion 100 in a pocket shape.

Referring to FIGS. 1 and 2, the main panel 100*a* is formed in a curled, rounded shape, and edges of the side panel 100*b* are sewn to the left and right sides of the main panel 100*a*.

In particular, the pocket portion 110 is formed at the middle portion of the main panel 100*a* such that the pocket portion 110 is fixed in a configuration in which the pocket portion 110 hangs on the inside of the airbag cushion 100. In addition, the entrance 110*a* of the pocket portion 110 is formed with an opening at the middle portion of the main panel 100*a*.

Accordingly, the passenger's head supported on the airbag cushion 100 enters the pocket portion 110 through the entrance 110*a* of the open pocket portion 110, thereby preventing the passenger's head supported on the airbag cushion 100 from tilting or bending backward.

A more detailed look at the configuration of the pocket portion 110 shows that the pocket portion 110 may be formed by conjoining a first pocket panel 111 and a second pocket panel 112, having a predetermined area at the middle portion of the main panel 100*a*, in a front-to-back manner; and may be formed into a pocket shape by fixing both side surfaces of the first pocket panel 111 and both side surfaces of the second pocket panel 112 to each other.

For example, the first pocket panel 111 and the second pocket panel 112 are formed in a rectangle panel shape at the middle portion of the main panel 100*a* and are conjoined to each other in a front-to-back manner.

Accordingly, inner corners of the first pocket panel 111 and inner corners of the second pocket panel 112, which are conjoined or connected to each other, are folded into the inside of the airbag cushion 100.

In this state, the left and right corners of the first pocket panel 111 and the left and right corners of the second pocket panel 112, which are folded into the inside of the airbag cushion 100, are sewn to each other, and thus the pocket portion 110 is formed into a pocket shape.

However, outer corners of the first pocket panel 111 and outer corners of the second pocket panel 112 facing each other on the outside of the airbag cushion 100 are not sewn to each other, and thus the entrance 110a of the pocket portion 110 exposed to the outside of the airbag cushion 100 may be formed with an opening.

In the present disclosure, the first pocket panel 111 and the second pocket panel 112 may be formed integrally with the main panel 100a.

That is, the first pocket panel 111 and the second pocket panel 112 are integrally formed at the middle portion of the main panel 100a, which is unfolded as shown in FIG. 2, and the first pocket panel 111 and the second pocket panel 112 are folded in an inward direction of the airbag cushion 100 to form the pocket portion 110.

Figure 7:
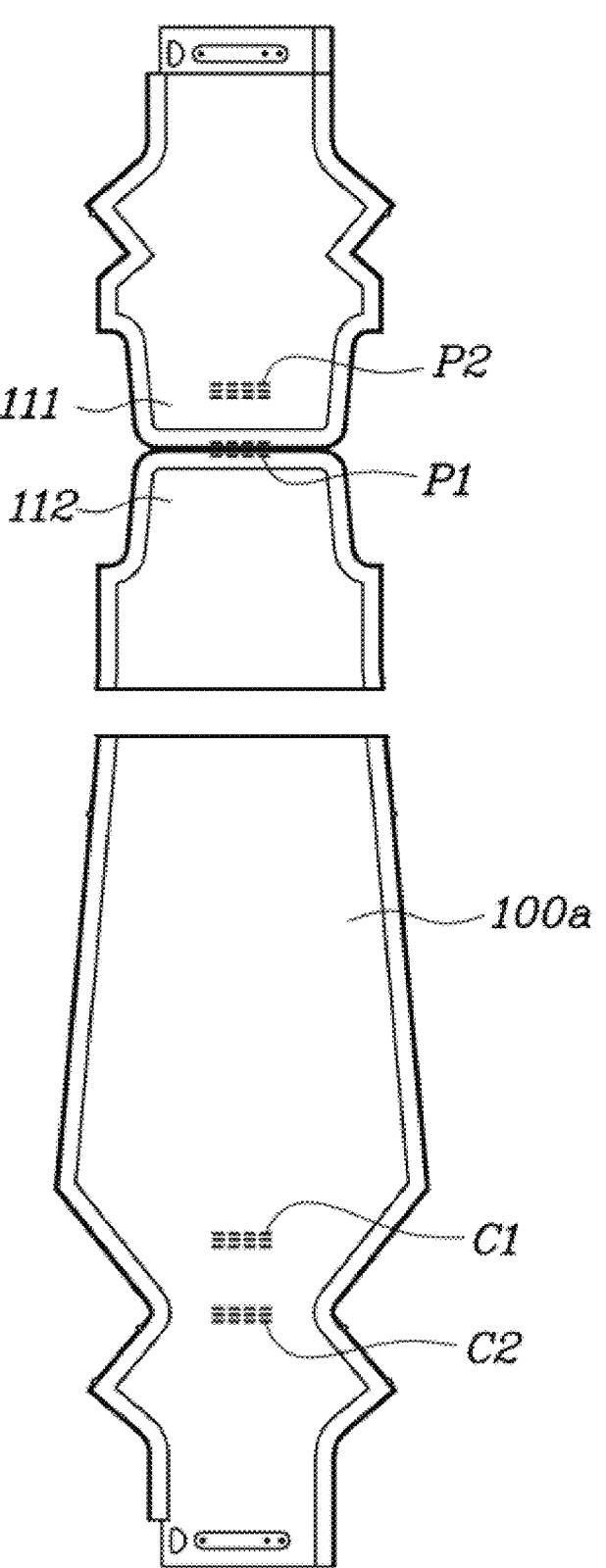
FIG. 7 is a view illustrating another unfolded main panel constituting the airbag cushion according to the present disclosure, from which the first pocket panel and the second pocket panel are provided separately.

In another example, as shown in FIG. 7, the first pocket panel 111 and the second pocket panel 112 may be provided separately from the main panel 100a.

Although not illustrated in the drawings, the first pocket panel 111 and the second pocket panel 112 are each separately fixed to an inner surface of the main panel 100a, which is in the inward direction of the airbag cushion 100, so as to form the pocket portion 110 at the middle portion of the main panel 100a.

Furthermore, the first pocket panel 111 and the second pocket panel 112 may be formed symmetrically with respect to a boundary line where the first pocket panel 111 and the second pocket panel 112 are conjoined or connected to each other, and may be folded along the boundary line, and sewn and fixed on the both side surfaces thereof.

For example, referring to FIG. 2, where the main panel 100a is unfolded, the first pocket panel 111 and the second pocket panel 112 are conjoined or connected to each other, and the first pocket panel 111 and the second pocket panel 112 are formed in a symmetrical configuration with respect to the corners of the boundary line, where the two panels 111 and 112 are conjoined or connected to each other, and overlap each other.

Accordingly, the left and right side corners of the first pocket panel 111 and the left and right side corners of the second pocket panel 112 are sewn in alignment with each other, thereby enhancing the ease of fabricating the pocket portion 110.

In addition, in the present disclosure, at least one tether may be connected between the pocket portion 110 and the airbag cushion 100.

In an embodiment of the tether, a first tether 200 may be connected between an end of the pocket portion 110 and an inner surface of the airbag cushion 100 located in a direction in which the passenger's head enters.

That is, as shown in FIG. 1, the first tether 200 keeps the space inside the pocket portion 110 deep inward and prevents the pocket portion 110 from escaping outward from the airbag cushion 100 by the gas supplied to the inside of the airbag cushion 100.

A more detailed look at the configuration of the first tether 200 shows that one end (or the first end) of the first tether 200 may be fixed to a boundary line of inner ends of the first pocket panel 111 and the second pocket panel 112; the other end (or the second end) of the first tether 200 may be fixed to the inner surface of the main panel 100a facing a front lower portion of the pocket portion 110.

For example, a first pocket fixing point P1 is formed at the boundary line where the first pocket panel 111 and the second pocket panel 112 are conjoined to each other, and one (or the first) end of the first tether 200 is fixed to the first pocket fixing point P1.

In addition, in the pocket portion 110, a first cushion fixing point C1 is formed on the inner surface of the main panel 100a extending toward a crash pad, and the other (or the second) end of the first tether 200 is fixed to the first cushion fixing point C1.

Accordingly, the first tether 200 pulls an inner end of the pocket portion 110 toward the crash pad located at the front lower portion of the pocket portion 110, thereby keeping the space inside the pocket portion 110 deep and, in particular, preventing the pocket portion 110 from escaping outward from the airbag cushion 100 due to the pressure of the gas filled inside the airbag cushion 100. Accordingly, the passenger's head may stably enter the pocket portion 110.

In addition, in another embodiment of the tether, second tethers 300 and 301 may be connected to the inner surface of the airbag cushion 100 located orthogonal to a side surface of the pocket portion 110 and a direction in which the passenger's head enters.

Figure 6:
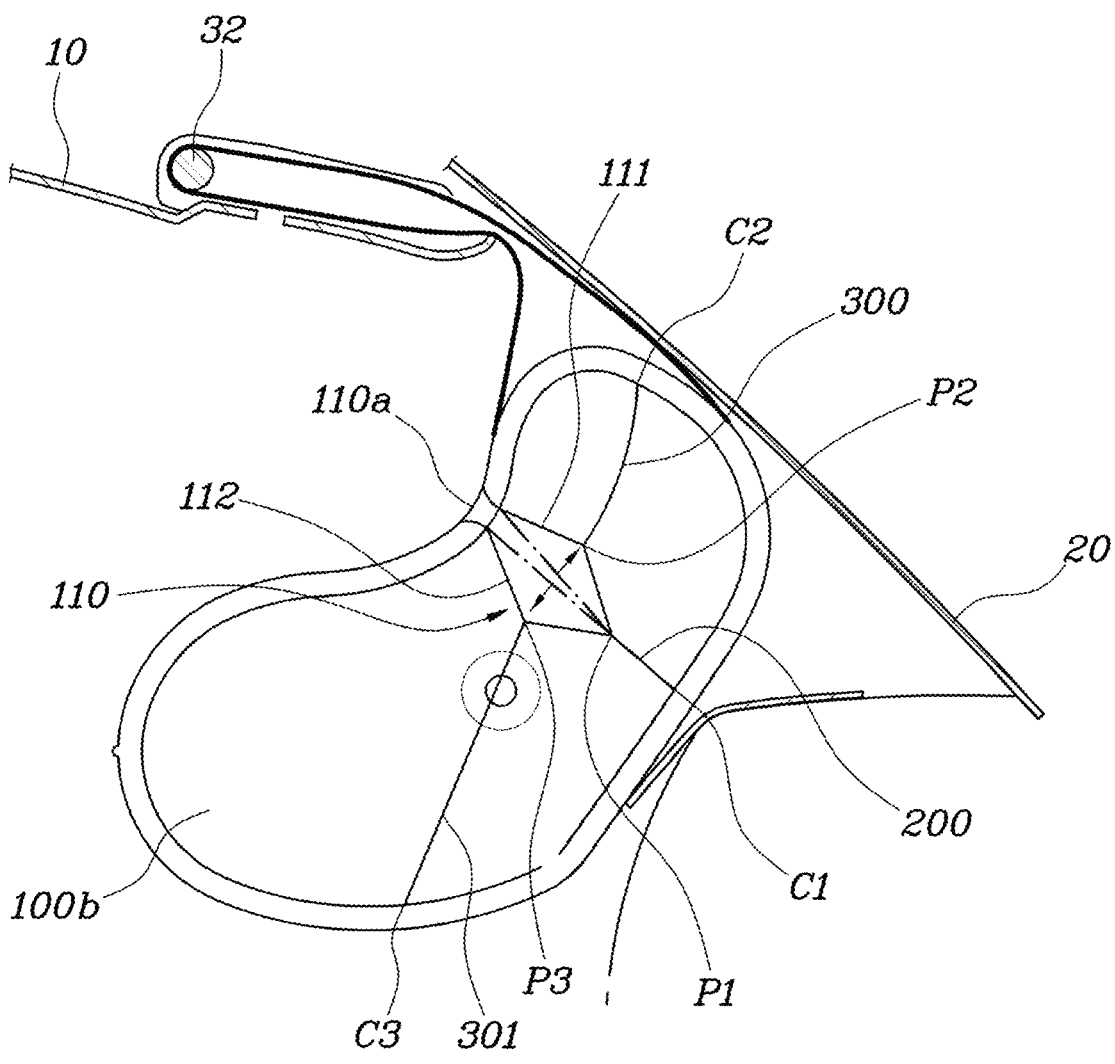
FIG. 6 is a view illustrating a configuration in which a second tether is additionally installed at the rear of a pocket portion according to the present disclosure.

That is, as shown in FIGS. 1 and 6, the second tethers 300 and 301 not only keep the space inside the pocket portion 110 wide inward, but also allow the entrance 110a of the pocket portion 110 to widen in a front-to-back direction. Accordingly, the passenger's head may easily enter the pocket portion 110.

A more detailed look at the configuration of the second tether 300 shows that one (or the first) end of the second tether 300 may be connected or fixed to the middle portion of the first pocket panel 111; and the other (or the second) end of the second tether 300 may be fixed to the inner surface of the main panel 100a facing a front upper portion of the pocket portion 110.

For example, a second pocket fixing point P2 is formed in a middle portion of an outer surface of the first pocket panel 111, and one (or the first) end of the second tether 300 is fixed to the second pocket fixing point P2.

In addition, in the pocket portion 110, a second cushion fixing point C2 is formed on the inner surface of the main panel 100a extending toward an upper side of the windshield 20, and the other (or the second) end of the second tether 300 is fixed to the second cushion fixing point C2.

Accordingly, the second tether 300 pulls the first pocket panel 111 toward the windshield 20 located at the front upper portion of the pocket portion 110, thereby keeping the space inside the pocket portion 110 wide, and in particular, widening the entrance 110a of the pocket portion 110, formed in a horizontal direction, in the front-to-back direction. Accordingly, the passenger's head may more easily enter the pocket portion 110.

In addition, in another embodiment of the second tether 300, one (or the first) end of the second tether 301 may be connected or fixed to the middle portion of the second pocket panel 112; and the other (or the second) end of the second tether 301 may be fixed to the inner surface of the main panel 100a facing a rear lower portion of the pocket portion 110.

For example, a third pocket fixing point P3 is formed in the middle portion of the outer surface of the first pocket panel 111, and one (or the first) end of the second tether 301 is fixed to the third pocket fixing point P3.

In addition, in the pocket portion 110, a third cushion fixing point C3 is formed on the inner surface of the main panel 100a extending toward a passenger's lower body, and the other (or the second) end of the second tether 301 is fixed to the third cushion fixing point C3.

Accordingly, the second tether 301 pulls the second pocket panel 112 toward the passenger's lower body located at the rear lower portion of the pocket portion 110, thereby keeping the space inside the pocket portion 110 wide, and in particular, widening the entrance 110a of the pocket portion 110, formed in a horizontal direction, in the front-to-back direction. Accordingly, the passenger's head may more easily enter the pocket portion 110.

In addition, the airbag cushion 100 of the present disclosure is configured to include: the airbag cushion 100 deployed toward the front of the passenger within the vehicle cabin; and the pocket portion 110 having a concave space formed in a portion of the airbag cushion 100 on which the passenger's head is supported.

That is, the pocket portion 110 of the present disclosure may be applied not only to the airbag cushion 100 that is mounted on the roof as described above, but also to the airbag cushion 100 that is deployed from an instrument panel toward the passenger.

As described above, in the present disclosure, the pocket portion 110 having the concave space configuration is provided in a portion of the airbag cushion 100 on which the passenger's head is supported, thereby preventing the passenger's head entering the pocket portion 110 formed in the airbag cushion 100 from bending backward, Therefore, a risk of neck injury to the passenger is reduced.

Although the specific embodiments of the present disclosure have been illustrated and described, those skilled in the art will appreciate that various modifications and changes to the present disclosure may be made without departing from the technical spirit of the present disclosure provided in the following claims.

What is claimed is:

1. An airbag cushion configured to be deployed within a vehicle cabin downwardly from a roof of a vehicle toward a front of a passenger of the vehicle, the airbag cushion comprising:
   a main panel including (1) a concave surface configured to face a head of the passenger when the airbag cushion is deployed and (2) a pocket portion extending inwardly from the concave surface and configured to support the head of the passenger when the head of the passenger is landed on the concave surface of the main panel; and
   a pair of side panels respectively connected to two opposed lateral sides of the main panel,
   wherein the pocket portion has (1) a pocket entrance including an opening located at the concave surface of the main panel and (2) a pocket space extending inwardly from the opening without extending through the main panel such that the head of the passenger enters into the pocket space through the opening when the airbag cushion is deployed and the head of the passenger is landed on the concave surface of the main panel.

2. The airbag cushion of claim 1, wherein:
   the pocket portion includes a first pocket panel and a second pocket panel that are joined together, and has a predetermined area at a middle portion of the main panel, in a front-to-back manner, and
   both side surfaces of the first pocket panel and both side surfaces of the second pocket panel respectively are connected to each other such that the pocket portion has a pocket shape.

3. The airbag cushion of claim 2, wherein the first pocket panel and the second pocket panel are formed integrally with the main panel.

4. The airbag cushion of claim 2, wherein the first pocket panel and the second pocket panel are provided separately from the main panel.

5. The airbag cushion of claim 2, further comprising a first tether connected between an end of the pocket portion and an inner surface of the airbag cushion.

6. The airbag cushion of claim 2, further comprising a second tether connected to an inner surface of the airbag cushion located orthogonal to a side surface of the pocket portion.

7. The airbag cushion of claim 6, wherein the second tether comprises:
   a first end connected to a middle portion of the first pocket panel; and
   a second end connected to an inner surface of the main panel facing a front upper portion of the pocket portion.

8. The airbag cushion of claim 6, wherein the second tether comprises:
   a first end connected to a middle portion of the second pocket panel; and
   a second end connected to an inner surface of the main panel facing a rear lower portion of the pocket portion.

9. An airbag comprising:
   an airbag cushion configured to be deployed within a vehicle cabin downwardly from a roof of a vehicle toward a front of a passenger of the vehicle; and
   a pocket portion having a concave space at a portion of the airbag cushion and configured to support a head of the passenger when the airbag cushion is deployed,
   wherein the airbag cushion comprises a main panel and a pair of side panels respectively disposed at two opposed sides of the main panel,
   wherein the pocket portion has an entrance including an opening located at a middle portion of the main panel, and is embedded, in a pocket shape, within the airbag cushion,
   wherein the pocket portion includes a first pocket panel and a second pocket panel that are joined together, and has a predetermined area at the middle portion of the main panel, in a front-to-back manner,
   wherein both side surfaces of the first pocket panel and both side surfaces of the second pocket panel respectively are connected to each other such that the pocket portion has a pocket shape,
   wherein the first pocket panel and the second pocket panel are symmetrical with respect to a boundary line at which the first pocket panel and the second pocket panel are connected to each other, and
   wherein the first pocket panel and the second pocket panel are folded along the boundary line, and sewn together at both side surfaces thereof.

10. An airbag comprising:
   an airbag cushion configured to be deployed within a vehicle cabin downwardly from a roof of a vehicle toward a front of a passenger of the vehicle; and
   a pocket portion having a concave space at a portion of the airbag cushion and configured to support a head of the passenger when the airbag cushion is deployed,
   wherein the airbag cushion comprises a main panel and a pair of side panels respectively disposed at two opposed sides of the main panel,
   wherein the pocket portion has an entrance including an opening located at a middle portion of the main panel, and is embedded, in a pocket shape, within the airbag cushion,
   wherein the pocket portion includes a first pocket panel and a second pocket panel that are joined together, and has a predetermined area at the middle portion of the main panel, in a front-to-back manner, wherein both side surfaces of the first pocket panel and both side surfaces of the second pocket panel respectively are connected to each other such that the pocket portion has a pocket shape, wherein the airbag further comprise a first tether connected between an end of the pocket portion and an inner surface of the airbag cushion, and wherein the first tether comprises:

a first end connected to a boundary line of inner ends of the first pocket panel and the second pocket panel; and a second end fixed to an inner surface of the main panel facing a front lower portion of the pocket portion.

\* \* \* \* \*